(12) United States Patent
Havewala et al.

(10) Patent No.: US 8,176,017 B2
(45) Date of Patent: May 8, 2012

(54) LIVE VOLUME ACCESS

(75) Inventors: Sarosh C. Havewala, Kirkland, WA (US); Vishal V. Ghotge, Seattle, WA (US); Neal R. Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/957,405

(22) Filed: Dec. 14, 2007

(65) Prior Publication Data

US 2009/0157770 A1 Jun. 18, 2009

(51) Int. Cl.
*G06F 17/00* (2006.01)

(52) U.S. Cl. ........ 707/690; 707/823; 711/162; 715/763; 713/2

(58) Field of Classification Search .................. 707/690, 707/691, 823, 999.2; 711/162; 715/5, 763; 713/2
See application file for complete search history.

(56) References Cited

U.S. PATENT DOCUMENTS

| | | | |
|---|---|---|---|
| 5,371,885 A | 12/1994 | Letwin | |
| 5,875,444 A | 2/1999 | Hughes | |
| 6,178,487 B1 | 1/2001 | Ruff et al. | |
| 6,185,666 B1 | 2/2001 | Murray et al. | |
| 6,493,727 B1 * | 12/2002 | Huang et al. | 1/1 |
| 6,615,365 B1 | 9/2003 | Jenevein et al. | |
| 6,885,670 B1 * | 4/2005 | Regula | 370/401 |
| 7,143,120 B2 * | 11/2006 | Oks et al. | 1/1 |
| 2003/0191930 A1 | 10/2003 | Viljoen et al. | |
| 2004/0078398 A1 * | 4/2004 | Chiang et al. | 707/204 |
| 2004/0083357 A1 | 4/2004 | Duncan et al. | |
| 2005/0065986 A1 * | 3/2005 | Bixby et al. | 707/204 |
| 2005/0114350 A1 * | 5/2005 | Rose et al. | 707/10 |
| 2005/0228832 A1 | 10/2005 | Ghotge et al. | |
| 2005/0246612 A1 * | 11/2005 | Leis et al. | 714/763 |
| 2006/0123210 A1 | 6/2006 | Pritchett et al. | |
| 2006/0136771 A1 * | 6/2006 | Watanabe | 714/1 |
| 2006/0224636 A1 * | 10/2006 | Kathuria et al. | 707/200 |
| 2006/0230243 A1 * | 10/2006 | Cochran et al. | 711/162 |
| 2007/0100817 A1 * | 5/2007 | Acharya et al. | 707/5 |
| 2007/0208700 A1 * | 9/2007 | Anei et al. | 707/3 |
| 2009/0055447 A1 * | 2/2009 | Sudhakar | 707/204 |

OTHER PUBLICATIONS

Lowe, "Check for Volume Errors in Windows Server 2003 with Vrfydsk.Exe and Chkdsk.Exe", Apr. 17, 2007, CNET Networks, Inc., 2007, p. 1.
"Chkdsk", 2007, Microsoft Corporation, pp. 5.
Kelbley, "Scripting Tips for Windows Administrators", 2003-2004, Microsoft Corporation, pp. 14.

* cited by examiner

*Primary Examiner* — Dennis Truong

(57) ABSTRACT

This document describes tools capable of enabling an entity requiring exclusive access to data and metadata of a volume to have that exclusive access while also permitting another entity to have access to data and metadata of that volume. The tools, for example, may permit a ChkDsk program to detect and correct data/metadata integrity errors while permitting users to maintain access to a live volume having that data and metadata. In one embodiment the tools create a copy of a logical volume, permit exclusive access to the copy while permitting access to the live volume, and, when the exclusive access is no longer needed, merge the copy and the live volume.

16 Claims, 7 Drawing Sheets

LIVE VOLUME ACCESS

BACKGROUND

Data filing systems often organize computer storage into volumes. Each volume is a logical representation of where data is stored, though it may correspond to part of one or many hardware storage devices.

These filing systems may use file system metadata to organize and track files stored on these volumes. The integrity of file system metadata, however, may be compromised, such as when hardware storage devices fail.

To address potential errors in file system metadata, various computer programs may be used. "Check disk" (a.k.a. "Chkdsk"), for example, may detect and fix errors. These and other error detection and correction programs, as well as other programs run on volumes, may require exclusive access to a volume. Exclusive access means that other programs or entities may not interact with that volume. A user, for example, may not access a song or word-processing file stored in a volume while one of these programs is running.

Further, some of these programs take an unknown amount of time. A system administrator, for example, may run Chkdsk starting at midnight Friday after most workers have gone home. The system administrator may not know if the program will prevent user access until Saturday morning or through Monday night. If it runs through Monday night users may not access their files for a whole workday.

SUMMARY

This document describes tools capable of enabling an entity requiring exclusive access to data and metadata of a volume to have that exclusive access while also permitting another entity to have access to data and metadata of that volume. The tools, for example, may permit a ChkDsk program to detect and correct data/metadata integrity errors while permitting users to maintain access to a live volume having that data and metadata. In one embodiment the tools create a copy of a logical volume, permit exclusive access to the copy while permitting access to the live volume, and, when the exclusive access is no longer needed, merge the copy and the live volume.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computer programs and other entities may require exclusive access to a logical volume, such as when a program needs to detect or correct errors in the volume. "Check disk" (a.k.a. "Chkdsk"), for example, requires exclusive access to a volume while detecting and correcting data/metadata inconsistencies for a filing system that manages data in that volume. While this exclusive access is required other entities, such as users, may not interact with that volume.

This may cause significant problems. Users often need to access their data, such as to view or change a document stored in the volume, but may not do so when exclusive access is required by another entity. Worse still, the amount of time that the entity requiring exclusive access may require is often unknown, which also makes unknown how long others are not permitted to access data in the volume. ChkDsk, for example, may run for fifteen minutes to detect and correct errors in a volume or fifteen days. During this time, no one may access files on the volume. If this is only from 2 am to 2:15 am on a Sunday morning the problem can more easily be worked around. But system administrators may not be able to know in advance how long exclusive access is required. And, even for entities that need access for a set period of time, it is still inconvenient for others wanting access to be denied that access.

The tools described herein address, among other things, this problem of exclusive access to a volume being required. For example, the tools, continuing the ChkDsk scenario, may run ChkDsk on data/metadata of a volume while permitting users and others to also access data/metadata of that volume. By so doing the tools enable, among other things, users and others to continually view and change data in a live volume while data/metadata of that volume is being corrected.

In the following discussion, an example environment is first described in which the tools may operate to enable an entity requiring exclusive access to data and metadata of a volume to have that exclusive access while also enabling another entity to have access to data and metadata of that volume. An example procedure is then described that may be employed in the example environment, as well as in other environments. Example volumes are also illustrated. Although these tools are described as employed within a server computing environment in the following discussion, it should be readily apparent that these tools may be incorporated within a variety of environments without departing from the spirit and scope thereof.

EXAMPLE ENVIRONMENT

Figure 1:
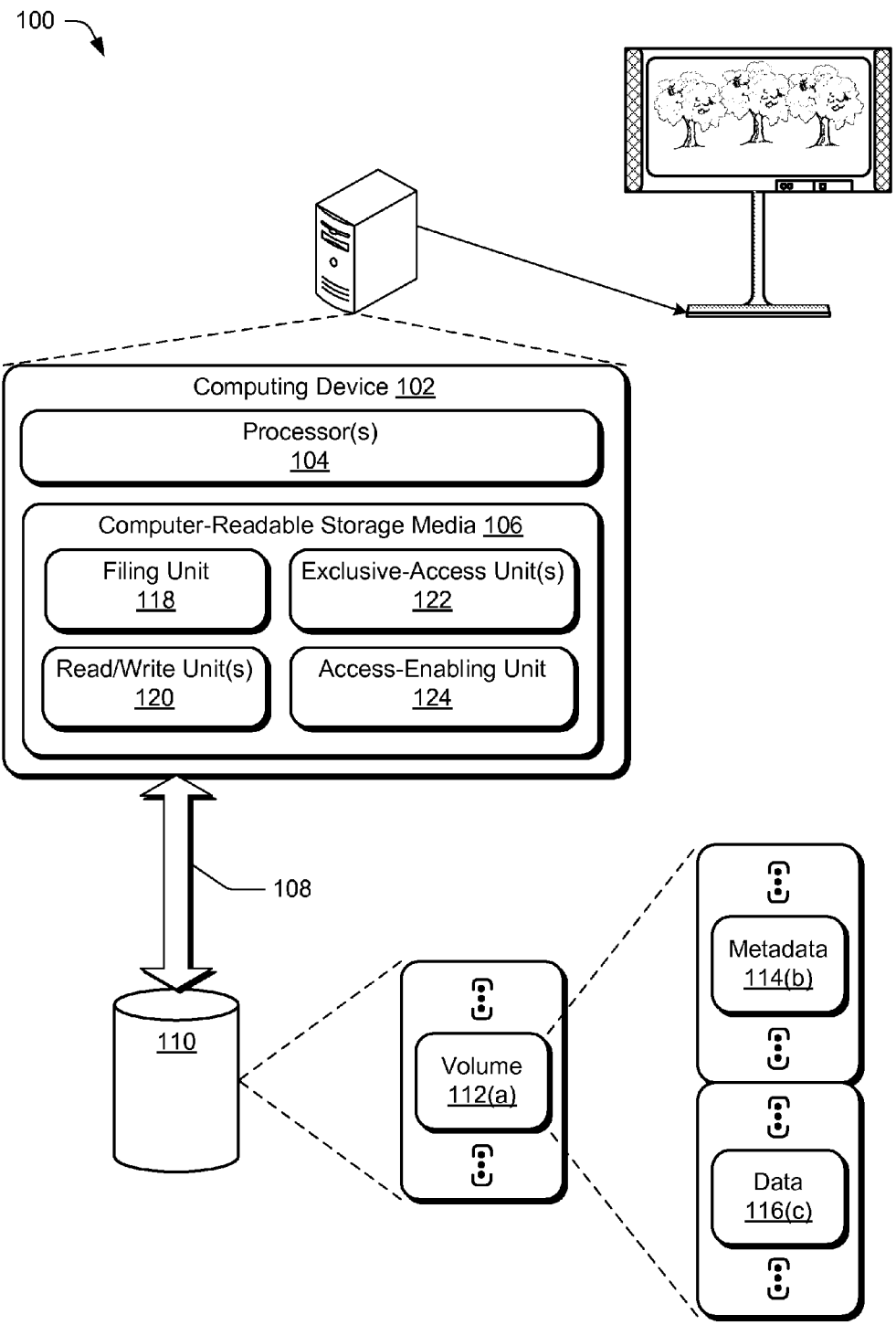
FIG. 1 is an illustration of an environment in which an example implementation of the tools may operate to enable an entity requiring exclusive access to data and metadata of a volume to have that exclusive access while also permitting another entity to have access to data and metadata of that volume.

FIG. 1 is an illustration of an environment 100 in an example implementation in which the tools may operate to enable an entity requiring exclusive access to data and metadata of a volume to have that exclusive access while also enabling another entity to have access to data and metadata of that volume. Environment 100 includes a computing device 102 including one or more processor(s) 104 and computer-readable storage media 106. The computing device may also include or be communicatively coupled, through network connection 108, with storage 110. Although a single network connection 108 is shown, it may represent network connections achieved using a single network or multiple networks. For example, network connection 108 may be representative of a broadcast network with back-channel communication, an Internet Protocol (IP) network, and so on.

Computing device 102 may be configured in a variety of ways. For example, the computing device may be configured as a computer that is capable of communicating over network connection 108, such as a desktop computer, a mobile station, an entertainment appliance, a server communicatively coupled to a display device as illustrated, or a laptop. For purposes of the following discussion, the computing device may also relate to a person and/or entity that operate the computing device. In other words, computing device 102 may describe a logical computing device that includes a user, software, and/or a machine. In the following discussion, the computing device may represent one or more entities and therefore reference may be made to a single entity (e.g., device 102) or multiple entities (e.g., devices 102).

Storage 110 includes one or more logical volumes of storage 112(a), where "a" can be any integer from 1 to "A". The logical volumes of storage may include a variety of data, such as word processing and spreadsheet files, songs, games, videos or television programs, applications, and so on. In the following discussion, logical volumes of storage 112(a) may also be referred to simply as "volumes" and each a "volume". Each volume 112(a) (or 112 when speaking generally) may include one or more items of metadata 114(b) and data 116(c), where any of "b" and "c" can be any integer from "1" to "B" and "1" to "C", respectively. These volumes, metadata, and data may be referred to herein with same or similar numbers whether altered (e.g., corrected, updated, and so on) or not.

Storage 110 may include one or many pieces of memory, which may themselves be configured in a variety of ways, such as a hard disk drive, a removable computer-readable medium (e.g., a writable digital video disc), semiconductor-based memory, and so on.

Computer-readable storage media 106 includes a filing unit 118, read/write unit(s) 120, exclusive-access unit(s) 122, and an access-enabling unit 124. Filing unit 118 may organize and manage logical volumes of storage 112 on storage 110. The filing unit may use metadata 114 to organize data 116 on volume 112. Metadata may include information about data, such as how large the data is, where the data is stored, a file name for the data, and so forth. Read/write units 120 may be any of various different entities capable of reading or writing data in a volume. Thus, a read/write unit may include a word-processing application that reads a file from the volume to allow a user to edit a document, receive an edit to the document, and then write that edit to the file associated with that document in the volume. When referring herein to a user accessing a volume, the read/write unit may be inferred to enable that access.

As noted above, metadata and data may have inconsistencies, which may be corrected with some example types of exclusive-access unit 122 (e.g., a ChkDsk application). Access-enabling unit 124 enables, among other things, exclusive-access unit 122 to have exclusive access to data and metadata of volume 112 while also permitting read/write unit 120 to also have access to data and metadata of that same volume 112.

Thus, in the environment 100 of FIG. 1, the filing unit manages and organizes storage into logical volumes of storage. Various read and/or writing-enabled entities (e.g., read/write unit 120) may then interact with these volumes to read and write data from a volume. Exclusive-access unit 122 may act to correct or otherwise interact with data and metadata of a volume 112 in a manner that requires exclusive access to the data and metadata of the volume. Access-enabling unit 124 permits this exclusive access while also permitting users and entities to also access the data and metadata of the volume (e.g., through read/write unit 120).

The computing device is illustrated as executing the units on processor(s) 104. These processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although storage 110 and media 106 are shown for the device 102, a wide variety of types and combinations of storage may be employed, such as random access memory (RAM), hard disk memory, removable medium memory, and other types of computer-readable media.

Note also that one or more of the entities shown in FIG. 1 may be further divided, combined (e.g., exclusive-access unit 122, access-enabling unit 124, and/or filing unit 120), and so on. Thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "tool" and "unit", as used herein generally represent software, firmware, hardware, or a combination thereof. In the case of a software implementation, for instance, each unit may represent program code that performs specified tasks when executed on a processor (e.g., CPU or CPUs). The program code can be stored in one or more computer-readable memory devices, such as computer-readable storage media 106 or storage 110. The features and techniques of the access-enabling unit are platform-independent, meaning that they may be implemented on a variety of commercial computing platforms having a variety of processors.

EXAMPLE COMPONENTS

The following discussion describes example logical components used by or included within access-enabling unit 124. Although portions of the following discussion refer to the environment 100 of FIG. 1, the following discussion should not necessarily be limited to that environment 100. After illustrating and listing the logical components in FIG. 2, this discussion turns to FIG. 3 to show a process by which the tools may act to enable access and exclusive access to data and metadata of a volume.

Figure 2:
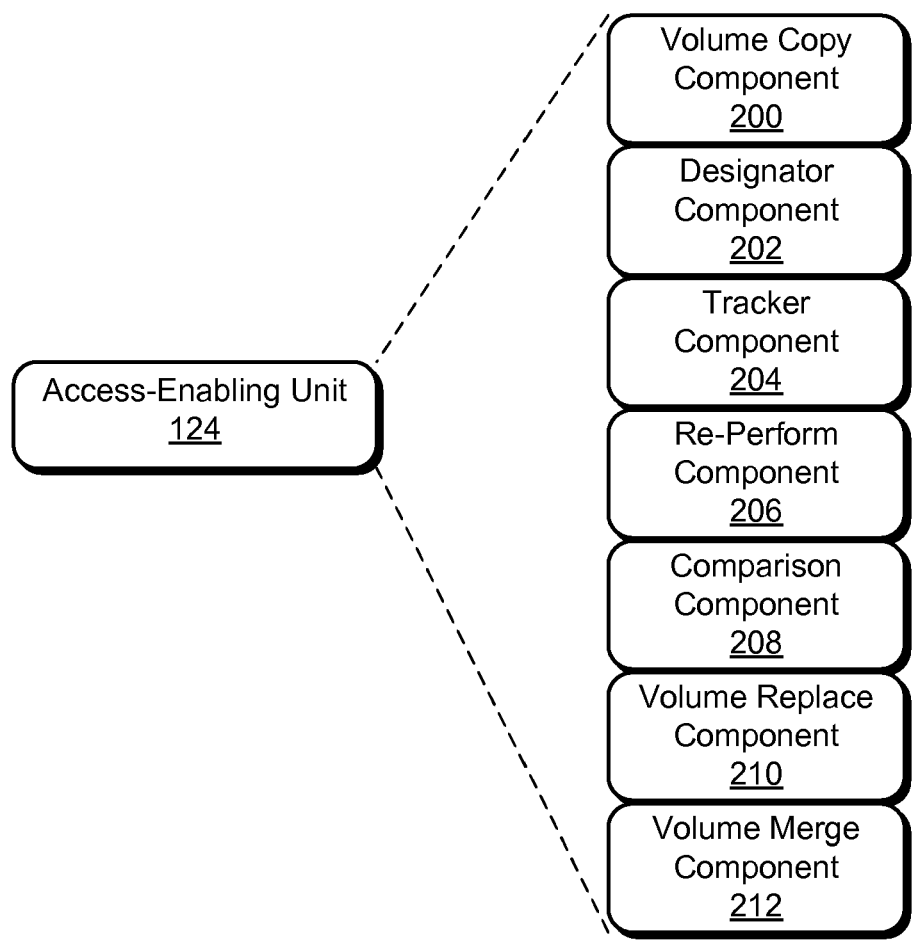
FIG. 2 illustrates example logical components of an access-enabling unit illustrated in FIG. 1.

FIG. 2 depicts access-enabling unit 124 having or using the following logical components: a volume copy component 200; a designator component 202; a tracker component 204; a re-perform component 206; a comparison component 208; a volume replace component 210; and a volume merge component 212.

Volume copy component 200 may copy a volume, such as a snapshot of a volume at an instant in time.

Designator component 202 may designate the original volume or the copy as being live or offline. A live volume is a volume to which users or other entities have access (e.g., a volume having data and/or metadata that may be read and/or changed). An offline volume is one to which one exclusive-access unit 122 has exclusive access when such unit is performing various actions, such as when the unit is a ChkDsk application fixing metadata/data inconsistencies in the offline volume.

Tracker component 204 may track actions and/or changes made to the live volume for re-play by re-perform component 206. Comparison component 208 may compare the live volume to the offline volume after some period of time past the instant in time at which the copy may be made to find files that have been changed since that instant in time.

Volume replace component 210 may replace a live volume with an offline volume, which may be done in such a way as to permit users or other entities accessing the live volume to continue access by switching their access from the live volume to the offline volume. This may be done with little or no perceived interruption in an entity's access.

Volume merge component 212 may merge the offline volume with the live volume, such as after changes have been made to the offline volume by the exclusive-access unit and/or changes have been made to the live volume by users or other entities.

All of the logical components may be separate from or combined with each other or the access-enabling unit. These components, for example, may be separate applications called by the access-enabling unit or may be integral with the access-enabling unit. The components described may be implemented using hardware or software and may represent computer-executable instructions.

EXAMPLE PROCEDURE

The following discussion describes ways in which the tools may operate to enable an entity requiring exclusive access to data and metadata of a volume to have that exclusive access while also enabling another entity to have access to data and metadata of that volume. Aspects of this procedure may be implemented in hardware, firmware, or software, or a combination thereof. The procedure is shown as a set of blocks that specify operations performed by the tools, such as through one or more units, devices, or components and are not necessarily limited to the orders shown for performing the operations by the respective blocks. In portions of the following discussion, reference may be made to the environment 100 of FIG. 1 and logical components of FIG. 2. Many of these blocks, for example, may be performed as contemplated with logical components of FIG. 2.

Figure 3:
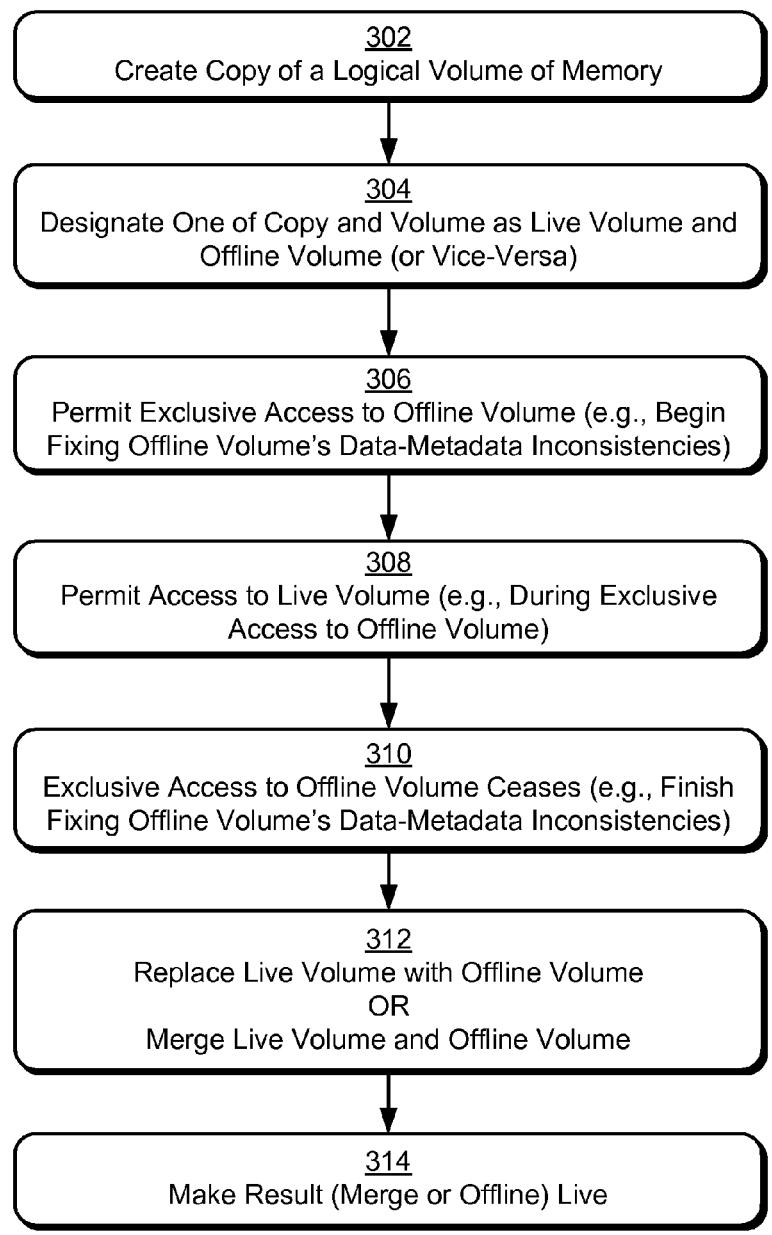
FIG. 3 is a flow diagram depicting a process in an example implementation in which the tools may act to enable access and exclusive access to data and metadata of a volume.

FIG. 3 depicts a procedure 300 in an example implementation in which both an entity requiring exclusive access and one or more other entities may access data and metadata of a logical volume.

Block 302 creates a copy of a logical volume. Block 302 may do so at an instant in time, such as by taking a snapshot or creating a mirror of the volume. By way of example, consider an example of volume 112 of FIG. 4 (marked "Original"). The original volume 112 occupies space "0" to "N" of storage 110. The copy of volume 112 (marked "Copy") is identical in that it has the exact same metadata and data except that it is stored elsewhere. The copy may be stored in a different portion of storage 110 or even in some other location. Here copy 112 is stored in storage 110 at "Y" to "Y+N" and does not overlap or interfere with original 112, where the amount of storage between "Y" and "Y+N" is the same amount as that between "0" and "N".

Note also that the data for the original and snapshot copy, in some embodiments, are shared and then stored in different locations as changes are made to one of the original volume or snapshot volume (e.g., using a copy on write mechanism).

In this example a file 400 (which is a particular piece of data 116) is stored at "X" to "X+L" between space "0" and "N". Filing unit 118 of FIG. 1, however, has recorded in metadata 114 that file 400 is stored at "X" to "X+K". Therefore, the metadata and the data are inconsistent as to the location and size of file 400.

Block 304 designates one of the copy and the volume as a live volume and the other one as an offline volume. Assume, for example, that the original volume is live at the instant in time that the copy is made. Block 304 may designate it as the live volume or may instead designate the copy as the live volume and the original as the offline volume. In either case, however, one of the two volumes may be accessed by users or other entities and the other by an exclusive-access unit.

In the ongoing example assume that designator component 202 designates the original volume as the live volume and the copy as the offline volume.

Block 302, as noted, creates a copy of volume 112. Thus, we have two identical volumes 112 at an instant in time. Block 304 designates one as live (Live 402) and the other as offline (Offline 404).

Block 306 permits exclusive access to the offline volume, such as by granting exclusive access in response to a request for exclusive access from exclusive-access unit 122. The tools, for example, may cause exclusive-access unit 122 to begin interacting with the offline volume. Continuing the ongoing example, consider offline volume 404 of FIG. 4. Here access-enabling unit causes a ChkDsk application to have exclusive access to offline volume 404 to begin to detect and fix data/metadata inconsistencies present in live volume 402 by interacting with offline volume 404.

Block 308 permits access to the live volume. Block 308 may act passively, such as when the original volume was live and is maintained as the live volume. Thus, entities may be accessing the original volume prior to a copy being created, during a copy being created, and after the copy is created without interruption. Thus, the act of designating the original volume as the live volume may simply keep the original volume as live. Users and other entities may continue to access live volume 402 while block 306 permits exclusive access to the offline volume.

At block 310 exclusive access to the offline volume ceases, such as when an exclusive-access unit ceases to require exclusive access to the offline volume. During the time that exclusive access to the offline volume was required, an entity accessing the live volume may not have had any interruption in access. Further, the extent of time that exclusive access was needed may be much more than any interruption in an entity's access (if a lack of access was even perceived or actual).

Figure 4:
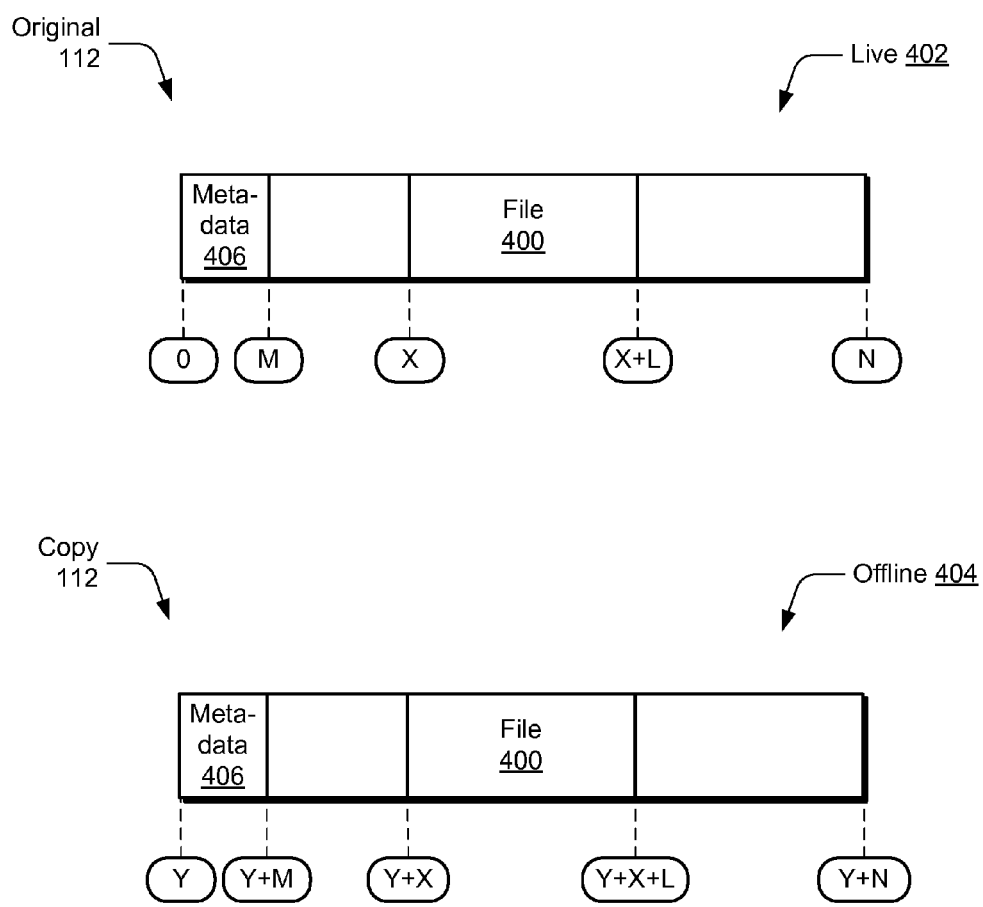
FIG. 4 illustrates an example original volume and a copy of that volume.
Figure 5:
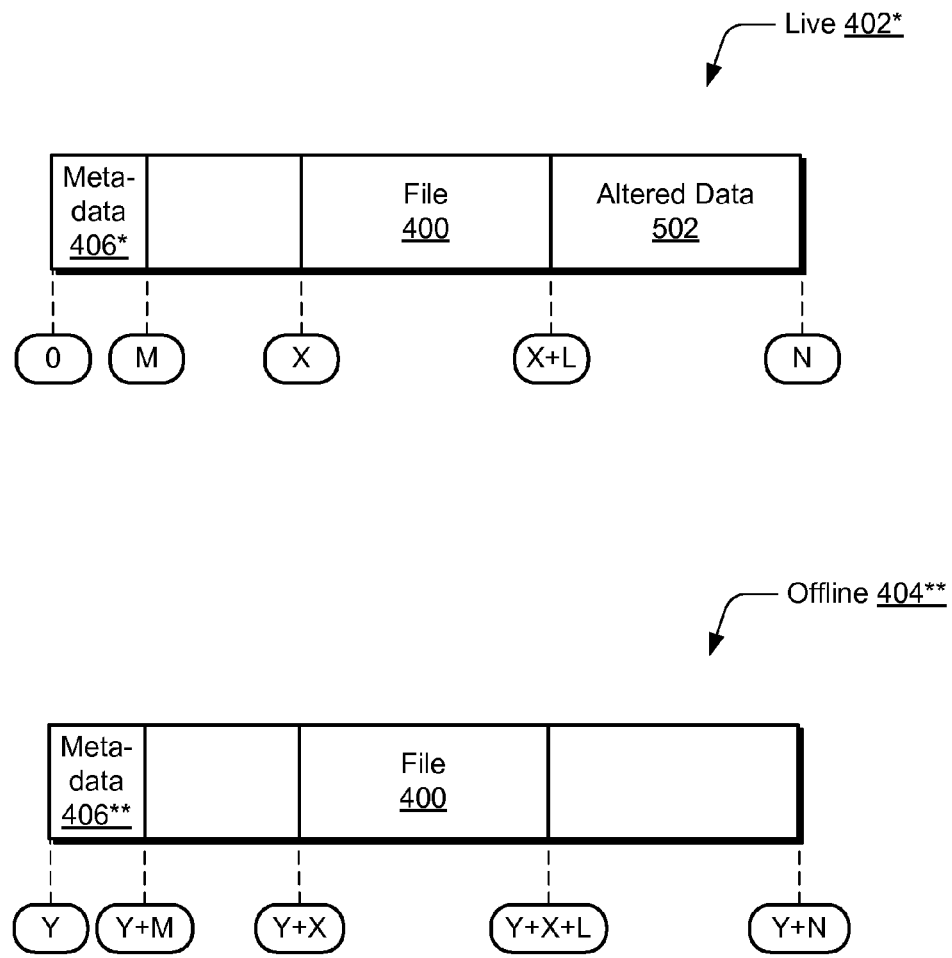
FIG. 5 illustrates the example original volume and the copy of that volume of FIG. 3 after designation as live and offline volumes and changes made to each of those live and offline volumes.

Continuing the example of FIG. 4, consider an example result of the ChkDsk application running. Here the offline volume has been corrected. As noted above file 400 was stored at "X" to "X+L" though the metadata recorded it as stored at "X" to "X+K". The ChkDsk detected this inconsistency and corrected it by altering the metadata to reflect that the file was actually stored at "X" to "X+L". In this case the change to the offline volume is simply a change to metadata, rather than to the data portion of the offline volume. This is shown at FIG. 5 with metadata 406 instead being metadata 406 in the offline volume 404, which is now indicated as changed by being marked 404 instead of 404.

Note also that during the time that exclusive access was required, users and other entities went on interacting with the live volume. Assume for example that a particular user, acting through read/write unit 120 of FIG. 1, wrote to another file, thereby altering data stored between "X+L" to "N". This is marked as 502 in the live volume 402* (402* indicating a change from 402 of FIG. 4). Filing unit 118 also alters metadata 406 of FIG. 4 to reflect this change to the data, resulting in 406* shown in FIG. 5.

Block 312 replaces the live volume with the offline volume or merges the live volume with the offline volume. Examples ways in which the tools may do so are set forth in FIG. 6, described later below. Block 312 may do so through access-enabling unit 124, which may follow instructions (such as from a system administrator) indicating whether to merge or replace or may do so as set forth in FIG. 6.

Block 314 makes the result of the merge or replace live. The tools may act to cause the result of the merge or replace to become live to entities accessing the live volume. In the case of a replace, the access currently being made to the live volume is switched to the resulting volume (which here is just the offline volume). When the offline volume or the merge volume becomes live it may replace the live volume. It may do so by the access-enabling unit causing access to the live volume to switch to access of the resulting volume, for example.

Figure 6:
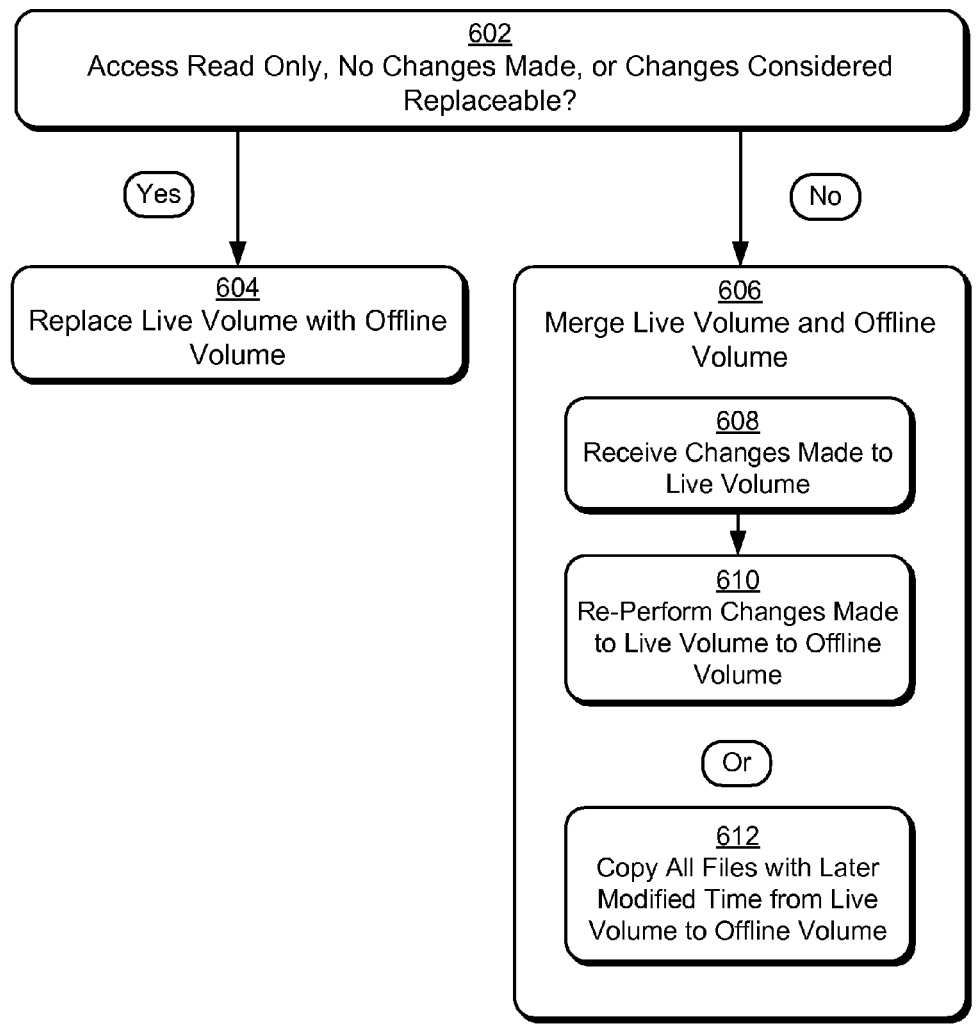
FIG. 6 is a flow diagram depicting an example implementation of block 312 of FIG. 3.

Having set forth process 300, the discussion turns to an example implementation of block 312 of FIG. 3 shown in FIG. 6.

Block 602 determines or receives indication of the access that was made to the live volume since the copy was made. This access may be read only, in which case entities were not allowed to write or otherwise change the volume since the copy was made. This access may permit reading and writing, but block 602 may indicate or determine that no changes were made. This access may also have resulted in changes being made, but block 602 determines that the changes are considered replaceable (e.g., can be redone or are not important).

Comparison component 208, for example, may compare the live volume with the offline volume to determine if there are any changes to the data or metadata of the volume. Or the access-enabling unit may require that access include only reading. Or the comparison component may determine that there are changes but that the changes are replaceable at some later time or are simply not important. The comparison component may determine that changes are replaceable or not important through interaction with a person, such as a system administrator, in some cases. The component and/or a person, for example, may determine that only one person has had write access to the live volume and that based on this that it is not worth the effort to merge the live and offline volume.

If the tools determine that the access was read only, no change was made, or considers the changes acceptable to lose, the tools proceed to block 604. Otherwise the tools proceed to block 606.

At block 604 the tools replace the live volume with the offline volume effective to cause the changes made by an exclusive-access unit to be reflected in the live volume or effective to switch entities over from accessing the live volume to the offline volume (which effectively makes the offline volume live and the live volume irrelevant).

At block 606 the tools merge the live and offline volumes, such as with volume merge component 212 of FIG. 2. The tools may do so in at least two example manners. The tools may follow block 608-610 or block 612.

Block 608 receives changes made to the live volume since the copy was made. The tools may do so by tracking, prior or incident with the copy being made, each change made to the data and metadata of the live volume (e.g., with tracker component 204 of FIG. 2). Thus, whether proactive or simply passively the tools may know what changes were made based on what writing actions were performed since the instant in time that the original volume was copied. This may aid the tools in merging the live and offline volumes more easily and/or quickly.

Block 610 re-performs the changes made to the live volume to the offline volume. Thus, if a change includes altering a word-processing file (e.g., resulting in altered data 502 of FIG. 5) by adding a paragraph to a word-processing file, the tools may make the same change to the data of the offline volume that was made to the live volume. The tools may do so with re-perform component 206 of FIG. 2.

Figure 7:
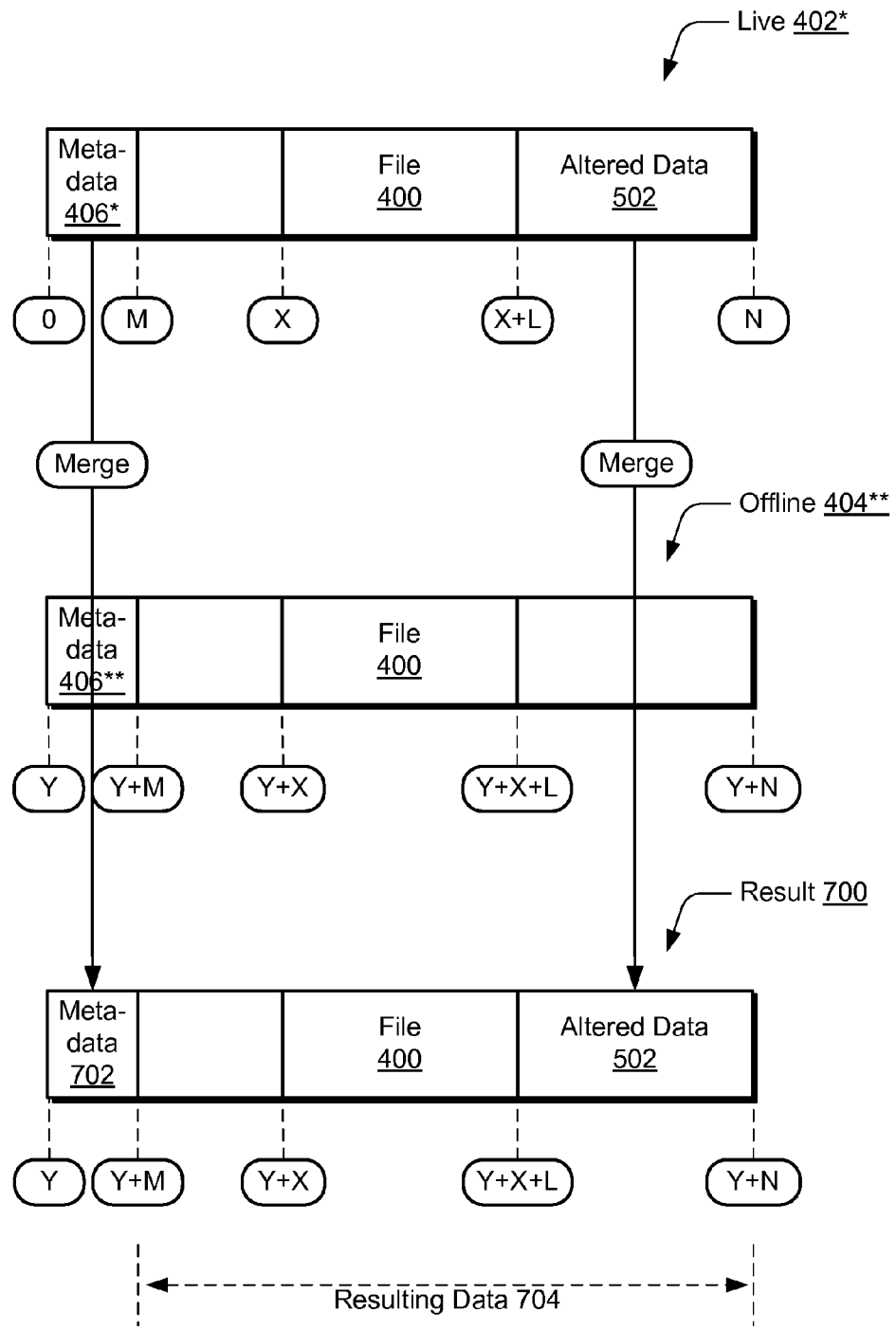
FIG. 7 is an illustration of an example result volume merging the live and offline volumes of FIG. 5.

Continuing the prior example, consider FIG. 7. Here the change reflected in altered data 502 of the live volume of FIG. 5 is reflected in the offline volume (illustrated with a "Merge" arrow). Here also the metadata change made to the live volume (shown at 406* in FIG. 5) is made to fixed metadata 406** also of FIG. 5 (also illustrated with a "Merge" arrow), resulting in a result volume 700 with metadata 702 and resulting data 704. The result is the offline volume that now reflects the changes made to the live volume since the copy was made and also reflects the corrections made by the ChkDsk application to the offline volume.

Alternatively, block 612 may merge the offline volume and the live volume by copying all files with later-modified times from the live volume to the offline volume. The resulting volume may be identical to that caused by blocks 608 and 610, though in some cases doing so takes more processing time or resources than that of blocks 608 and 610.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media having computer-readable instructions therein that, when executed by a computing device, cause the computing device to perform acts comprising:

create, when a first user or entity is accessing a logical volume, a snapshot copy of the logical volume at an instant in time;

designate the copy as an offline volume and the logical volume as a live volume;

after or at the instant in time, permit the first user or entity to change the live volume;

receive changes made to the live volume by the first user or entity;

after or at the instant in time, permit an exclusive-access unit requiring exclusive access to have exclusive access to the offline volume to fix one or more data-metadata inconsistencies in the offline volume;

determine that the changes made to the live volume are replaceable or receive an indication indicating that the changes made to the live volume are replaceable, the changes determined to be replaceable when capable of being redone or determined not to be important; and after the one or more data-metadata inconsistencies in the offline volume are fixed and the exclusive access to the offline volume by the exclusive-access unit ceases, switch access from the live volume to the offline volume without first making the changes to the offline volume and when the first user or entity or a second user or entity is accessing the live volume.

2. The media of claim 1, wherein the exclusive-access unit is a Check Disk "ChkDsk" application.

3. The media of claim 2, wherein the data-metadata inconsistencies include a particular inconsistency of a file in the data being stored at a different location than the metadata records the file being stored.

4. The media of claim 3, wherein the offline volume that is now fixed of the data-metadata inconsistencies is fixed of said particular inconsistency by the ChkDsk application altering the metadata of the offline volume to record the different location.

5. A method comprising:
designating a copy of a logical volume as an offline volume and the logical volume as a live volume, the copy created when a first user or entity is accessing the logical volume, the copy of the logical volume being a snapshot of the logical volume at an instant in time in which the first user or entity is accessing the logical volume;
receiving an indication of when exclusive access to the offline volume ceases; determining that
one or more changes made to the live volume by the first user or entity after or at the instant in time were made but that the one or more changes are replaceable, the changes determined to be replaceable when capable of being redone or determined not to be important, and
after exclusive access to the offline volume ceases, one or more data-metadata inconsistencies in the offline volume are corrected, and responsive to the act of determining, switching access from the live volume to the offline volume when the first user or entity or a second user or entity is accessing the live volume.

6. The method of claim 5, further comprising: making the one or more changes to the offline volume, the making the one or more changes to the offline volume performed after the act of switching access from the live volume to the offline volume and performed without an interruption that is perceptible to one or more users or entities having access to the live volume.

7. The method of claim 5, wherein the acts of designating, receiving, and switching are effective to enable one or more users or entities to access data and metadata of the live volume while the same data and metadata in the offline volume are corrected of the one or more data-metadata inconsistencies.

8. The method of claim 7, wherein the data and metadata in the offline volume are corrected of data-metadata inconsistencies by a Check Disk application that required the exclusive access to the offline volume and from which the indication of when exclusive access to the offline volume ceases was received.

9. The method of claim 5, further comprising:
creating, at the instant in time, the copy of the logical volume;
permitting the exclusive access to the offline volume at or after the instant in time and prior to the act of receiving; and
permitting an entity having access to the logical volume at the instant in time to maintain access to data in the logical volume by enabling access to the data in the live volume.

10. The method of claim 5, wherein the acts of designating, receiving, and switching are effective to enable one or more users or entities to access data of the live volume while the same data in the offline volume is accessed by an entity requiring the exclusive access.

11. A computing device comprising:
memory having a logical volume of storage;
an exclusive-access unit; and
an access-enabling unit, the access-enabling unit configured to:
designate a copy of the logical volume as an offline volume and the logical volume as a live volume, the copy created when a first user or entity is accessing the logical volume, the copy of the logical volume being a snapshot of the logical volume at an instant in time in which the first user or entity is accessing the logical volume;
receive an indication of when exclusive access to the offline volume of the exclusive-access unit ceases;
determine that one or more changes made to the live volume by the first user or entity after or at the instant in time were made but that the one or more changes are replaceable, the changes determined to be replaceable when capable of being redone or determined not to be important, and
after exclusive access to the offline volume ceases and one or more data-metadata inconsistencies in the offline volume are corrected, switch access from the live volume to the offline volume when the first user or entity or a second user or entity is accessing the live volume.

12. The computing device of claim 11, wherein the access-enabling unit is further configured to make the one or more changes to the offline volume after the switch and without an interruption that is perceptible to one or more users or entities having access to the live volume.

13. The computing device of claim 11, wherein the access-enabling unit is further configured to enable one or more users or entities to access data and metadata of the live volume while the same data and metadata in the offline volume are corrected of the one or more data-metadata inconsistencies.

14. The computing device of claim 11, wherein the exclusive-access unit is a Check Disk application.

15. The computing device of claim 11, wherein the access-enabling unit is further configured to:
create, at the instant in time, the copy of the logical volume;
permit the exclusive access to the offline volume at or after the instant in time and prior to the switch; and
permit an entity having access to the logical volume at the instant in time to maintain access to data in the logical volume by enabling access to the data in the live volume.

16. The computing device of claim 11, wherein the access-enabling unit enables one or more users or entities to access data of the live volume while the same data in the offline volume is accessed by the exclusive-access unit.

* * * * *